Sept. 28, 1943.   M. KNIGHT ET AL   2,330,292
FILM HOLDER AND METHOD OF MAKING THE SAME
Filed Sept. 23, 1940   2 Sheets-Sheet 1
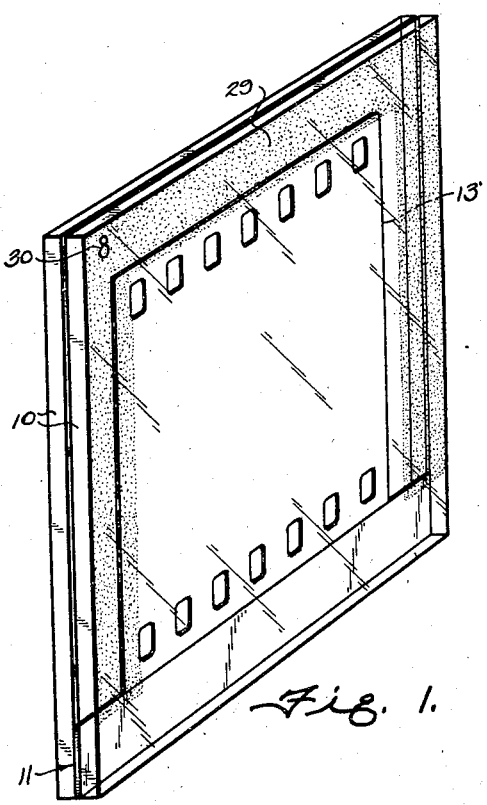
Fig. 1.
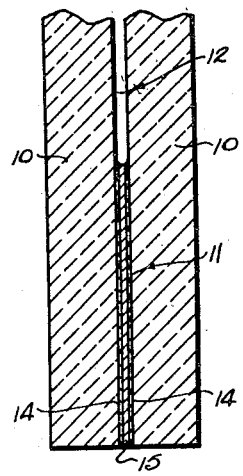
Fig. 3.
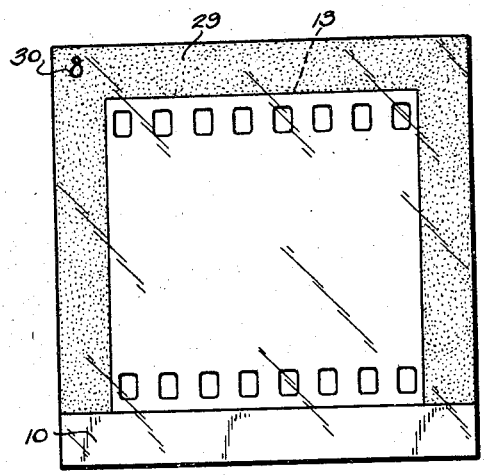
Fig. 2.
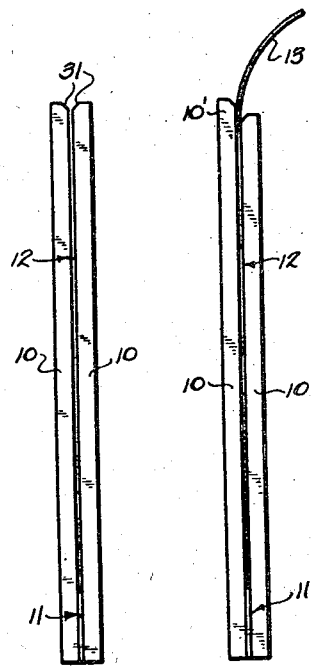
Fig. 8.
Fig. 9.
Inventors
MILTON KNIGHT
JOHN J. HOPFIELD
By Frank Fraser
Attorney Sept. 28, 1943.  M. KNIGHT ET AL  2,330,292
FILM HOLDER AND METHOD OF MAKING THE SAME
Filed Sept. 23, 1940  2 Sheets-Sheet 2
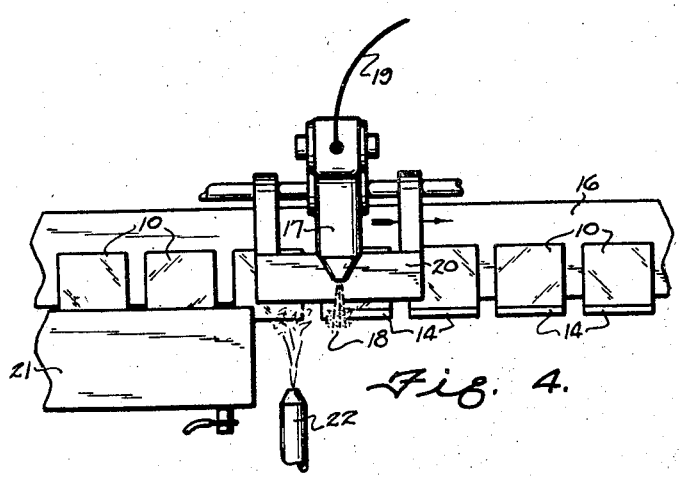
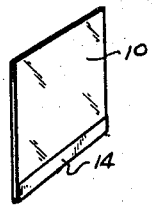
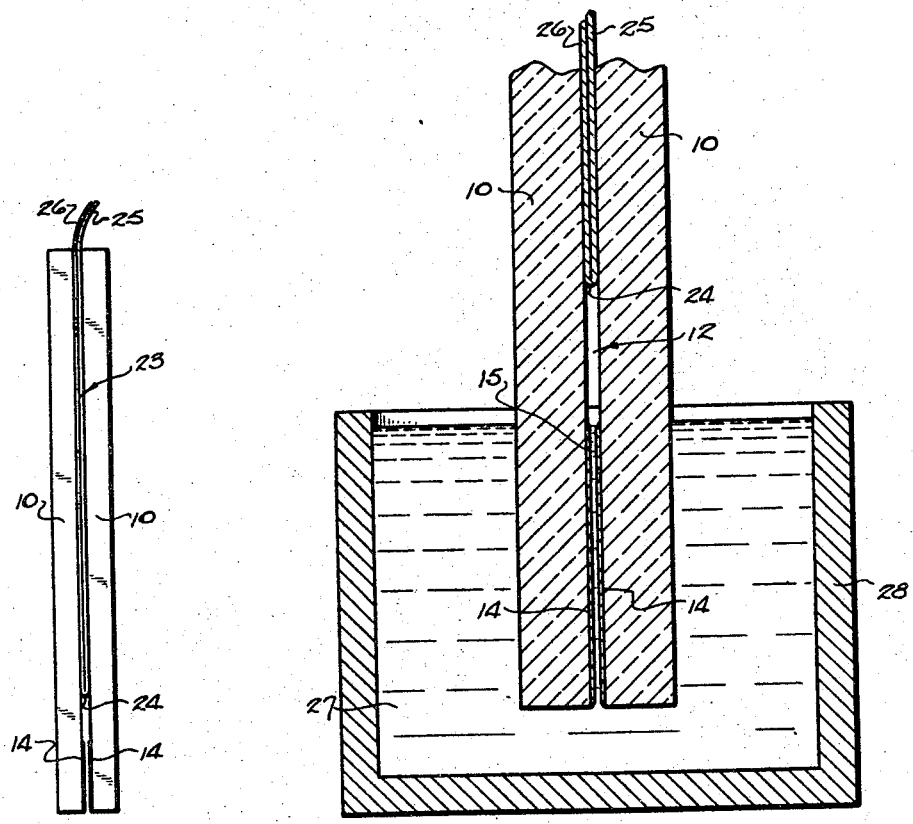
Inventors
MILTON KNIGHT
JOHN J. HOPFIELD
By Frank Fraser
Attorney Patented Sept. 28, 1943

2,330,292

UNITED STATES PATENT OFFICE 2,330,292

FILM HOLDER AND METHOD OF MAKING THE SAME

Milton Knight, Perrysburg, and John J. Hopfield, Toledo, Ohio, assignors to Libbey-Owens-Ford Glass Company, Toledo, Ohio, a corporation of Ohio Application September 23, 1940, Serial No. 357,936

10 Claims. (Cl. 88—26)

The present invention relates to an improved type of film holder for use in connection with still projecting machines and to the method of producing the same.

An object of this invention is the provision of a film holder of all glass-metal construction which will hold the film securely in place against slippage, while at the same time permitting easy and convenient removal and replacement thereof.

Another object of the invention is the provision of a film holder of the above character which will serve to maintain the film flat and prevent buckling thereof.

Another object of the invention is the provision of a film holder of the above character which will serve to effectually protect the film from dirt, dust and the like and which is at the same time readily accessible for cleaning.

Another object of the invention is the provision of a film holder of the above character so constructed that the film may be easily and quickly inserted therein without danger of scratching and which also embodies means for facilitating the accurate positioning of the film within said holder.

A further object of the invention is the provision of a film holder formed of materials which will not be injured by the heat generated by the projecting machine even though it is accidentally left in the machine over a relatively long period of time with the machine turned on.

A further object of the invention is the provision of an all glass-metal type of film holder embodying two flat sheets of glass spaced from one another to receive the film therebetween and permanently secured together along at least one edge thereof by a metallic seal or joint.

A still further object of the invention is the provision of an improved method of making the film holder and more particularly for forming the metallic seal or joint between the two sheets of glass.

Other objects and advantages of the invention will become more apparent during the course of the following description, when taken in connection with the accompanying drawings.

In the drawings, wherein like numerals are employed to designate like parts throughout the same:

Fig. 1 is a perspective view of a film holder constructed in accordance with the present invention;

Fig. 2 is a face view thereof;

Fig. 3 is a transverse vertical sectional view through a portion of the film holder showing the metallic seal or joint between the two sheets of glass;

Fig. 4 is a diagrammatic plan view of one form of apparatus which may be employed for metallizing the glass sheets prior to the securing of them together;

Fig. 5 is a perspective view of one of the glass sheets after being metallized;

Fig. 6 is an end view showing the two sheets of glass assembled with respect to one another and ready to be joined;

Fig. 7 is a sectional view illustrating the joining of the two sheets; and

Figs. 8 and 9 are end views showing two slightly modified types of film holders also embodying the invention.

With reference now to the drawings and particularly to Figs. 1, 2 and 3, there is illustrated a film holder constructed in accordance with the present invention and comprising two relatively small sheets or panes of glass 10—10 secured together along one edge thereof by a metallic seal or joint 11. The metallic seal 11 serves not only to permanently secure the glass sheets 10—10 together but also maintains them slightly spaced from one another to form an opening 12 therebetween for the reception of the photographic film 13. Although the metallic seal may be arranged at two or even three edges of the film holder, it is preferred that it be arranged along only one edge thereof as illustrated in the drawings. The metallic seal 11 consists briefly of the metallic coatings or ribbons 14—14 provided upon the inner adjacent surfaces of the glass sheets 10—10 along the marginal edge portions thereof and secured together by an interposed metal filler 15 preferably of solder.

In applying the metallic coatings 14—14 to the glass sheets 10—10 the entire sheet or only the marginal portion thereof to be coated is first preferably heated, after which molten metal is sprayed upon the marginal portion of said sheet. In Fig. 4 of the drawings is illustrated one type of apparatus and method which can be employed for heating the glass sheets and for applying the metallic coatings thereto. As therein shown, the glass sheets 10 to be metallized are supported horizontally upon and carried forwardly by a suitable conveyor 16 beneath a metallizing gun 17. This gun may be of any conventional construction capable of producing a spray of molten metal 18 which can be directed upon the preselected portions of the glass sheets moving thereunder. It is preferred that a spray gun be used in which a metal wire 19 of the desired composition is fed into the gun, melted, and sprayed in fine particles upon the glass. The deposit of metal upon the glass is not only controlled by the relative position of the gun with respect to the glass, speed of wire through the gun, and speed of movement of the glass, but also by a guard member 20 which may be used for this purpose. The metal sprayed upon the glass is a solderable type of metal such as, for example, pure copper or a copper alloy.

Before the metal is sprayed upon the glass, the marginal portions of the glass sheet are first heated to the desired temperature. The exact temperature used will depend somewhat upon the size and thickness of the glass sheets, but in all cases where heating is resorted to care should be exercised to avoid warpage of the glass. For ordinary plate and window glass, it has been found that a temperature of between 500 and 600 degrees Fahrenheit is satisfactory, although this temperature may be varied as desired.

As each glass sheet 10 is carried along by the conveyor 16 and before it reaches the metal spray gun 17, the forward marginal edge portion of the sheet, which projects beyond the conveyor, passes through an electrical heating device 21. The number of heaters and length of heating zone will depend upon the speed of the machine and exact operating temperatures desired. After the glass sheet passes beyond the heating device 21 and just before the metal is sprayed thereon, the marginal edge portion thereof is preferably subjected to the action of one or more burners 22 which heat the surface of the glass to the desired maximum temperature for the reception of the metal spray.

The heating means is so controlled that when the glass sheet reaches a position under the metal spray gun, it is within the predetermined temperature range desired. The conveyor 16 is preferably moved continuously forwardly so that successive sheets of glass 10 are presented progressively to the spray of metal 18 issuing from the gun 17. A glass sheet 10 having the marginal edge portion thereof provided with the metallic coating 14 is shown in Fig. 5.

After the metallic coating 14 has been applied to the glass sheet 10, it is treated with a suitable soldering flux and this flux can be applied to the metallic coating by means of a brush or in any other desired manner. However, after the metallic coating has been applied to the glass, there is a tendency toward oxidation thereof. Therefore, to facilitate subsequent soldering of the metal coated glass, this oxidation should be removed before the flux is applied and for this purpose the metallic coating may be subjected to a fine hydrogen flame.

After two sheets of glass 10 have been provided with the metallic coatings 14, they are adapted to be secured together in spaced substantially parallel relation as shown in Fig. 3 by means of the interposed layer or filler of solder 15. In securing the glass sheets 10—10 together, there is first placed between the sheets a suitable spacer 23 and, while this spacer may be of any suitable material, we have satisfactorily made use of a sheet of paper folded upon itself as at 24 to provide the two thicknesses 25 and 26 as illustrated in Fig. 6. The folded edge 24 of the paper spacer 23 is positioned adjacent to but spaced from the metallic coatings 14—14 and the outer edges of the glass sheets opposite to the metallic coatings are gripped by means of a suitable clamp. While thus gripped, the operator immerses the metallic coated edge portions 14—14 of the glass sheets 10—10 in a bath of molten solder 27 contained in a suitable receptacle 28. Upon dipping of the glass sheets into the solder bath 27, the molten solder will pass upwardly between the spaced sheets and adhere firmly to the metallic coatings 14—14 resulting in the soldering of them together. The glass sheets are then lifted from the solder bath and after the solder is solidified the spacer 23 is removed and the holder is ready for use. The solder of course will not wet the uncoated portions of the glass sheets which therefore form a natural boundary for the solder.

In accordance with our invention, it is preferred that the temporary spacer 23 for the glass sheets be either slightly wedge-shaped or of such construction that the edges of the glass sheets opposite to the metallic coatings 14—14 will be brought slightly closer together when the clamp is applied thereto than the opposite or coated edge portions thereof. When the sheets are clamped together in this manner and the metallic coatings soldered together, it will be found that while the glass sheets are substantially parallel with one another they converge slightly from the metallic coated edges to the opposite edges thereof and, as a result, the outer or free edges of the sheets exert a yielding, spring grip upon the film placed therebetween. We have found that when using a spacer of folded paper as illustrated in Fig. 6 and in gripping the sheets adjacent their upper edges during dipping of the lower coated edge portions in the solder bath, the said upper edge portions will be relatively closer together than the lower edge portions thereof. This is due to the fact that the folded edge 24 of the spacer is relatively stiffer and will not be compressed to the same extent as the two thicknesses 25 and 26 of the spacer when the clamp is applied to the outer edge portions of the sheets. Also, this may be due to the manner in which the solder freezes at the joint.

Due to this resilient gripping of the film by the glass sheets, the film will be securely held in place therebetween, while at the same time it may be readily removed therefrom. Such removal can be effected by inserting a thin blade or other tool between the outer edges of the glass sheets and forcing them slightly away from one another. The glass sheets will also hold the film flat and prevent buckling thereof, as well as protecting the film from dirt, dust and the like. Likewise, the inner surfaces of the glass sheets are readily accessible for cleaning. By constructing the film holder entirely of glass and metal it will also effectively withstand the heat of the projecting machine and will not be injured even though the holder is left in the machine over a long period of time with the machine turned on.

Another feature of our film holder is in the provision of means for facilitating the accurate positioning of the film in the holder as well as providing means for receiving suitable numbers, letters or other marks used to identify the film in the holder. This is herein accomplished by providing upon the outer surface of one of the glass sheets, and preferably around the three unattached edges thereof, a sand-blasted or other suitably roughened border 29, the inner edges of which will define the position of the film. Suitable letters, numbers or other identifying marks shown at 30 to designate the film contained in the holder can also be applied to the sand-blasted or roughened body 29 by means of pencil or ink.

As illustrated in Fig. 1, the unattached edges of the glass sheets 10—10 are square but, if desired, the said edges may be beveled as indicated at 31 in Fig. 8 to avoid any danger of the film being scratched by the sharp edges of the glass sheets during the placement of the film in the holder or its removal therefrom. Likewise, if desired, to facilitate the insertion of the film between the glass sheets one of the sheets may be projected slightly beyond the other as indicated at 10' in Fig. 9 to form a guide along which the edge of the film can be moved into the space 12 between the glass sheets 10—10.

As pointed out above, two or even three of the edges of the glass sheets 10—10 may be secured together, but for a number of practical reasons it is preferred that they be secured along one edge only as herein disclosed. If desired, the other three edges may be sealed with a suitable tape after the film has been placed therein.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. A film holder, comprising two spaced, substantially parallel sheets of glass for receiving the film therebetween, and metallic means arranged entirely between the glass sheets along one edge thereof and adherent thereto for securing them together in properly spaced relation to provide an all glass-metal construction.

2. A film holder, comprising two spaced, substantially parallel sheets of glass for receiving the film therebetween, and a metallic seal arranged entirely between the glass sheets along one edge only thereof for securing them together in properly spaced relation to provide an all glass-metal construction.

3. A film holder, comprising two spaced, substantially parallel sheets of glass for receiving the film therebetween, metallic coatings formed upon the opposed surfaces of the glass sheets along one marginal edge portion thereof, and a solder filler interposed between and firmly adherent to said metallic coatings for maintaining the glass sheets in properly spaced relation and to provide an all glass-metal construction.

4. A film holder, comprising two spaced, substantially parallel sheets of glass for receiving the film therebetween, sprayed metallic ribbons formed upon the opposed surfaces of the glass sheets along one marginal edge portion thereof, and a layer of solder interposed between and firmly adherent to said metallic ribbons for maintaining the glass sheets in properly spaced relation and to provide an all glass-metal construction.

5. A film holder, comprising two spaced, substantially parallel sheets of glass for receiving the film therebetween, and a metallic seal arranged between the glass sheets and adherent thereto along one edge thereof for securing them together in properly spaced relation to provide an all glass-metal construction, one of the glass sheets being provided upon its outer surface with a roughened border defining the area in which the film should be located.

6. A film holder, comprising two spaced sheets of glass for receiving the film therebetween, and a metallic seal arranged between the glass sheets and adherent thereto along one edge thereof for securing them together in properly spaced relation to provide an all glass-metal construction, said glass sheets converging slightly toward one another toward the edge thereof opposite the metallic seal to exert a resilient spring pressure upon the film.

7. The method of producing a film holder of all glass-metal construction, comprising the steps of metallizing the marginal portions of one surface only of two sheets of glass along one edge thereof, arranging the glass sheets in spaced relation with the metallized surfaces thereof facing one another, and then joining the metallized surfaces with a solder filler firmly adherent thereto and securing said sheets together in properly spaced relation.

8. The method of producing a film holder of all glass-metal construction, comprising the steps of spraying molten metal upon the marginal portions of two sheets of glass along one edge thereof to form metallic ribbons thereon, arranging the glass sheets in spaced relation with the metallic ribbons thereon facing one another, and then introducing molten solder between the metallic ribbons for joining said ribbons to one another and securing the glass sheets in properly spaced relation.

9. The method of producing a film holder, comprising the steps of spraying molten metal upon the marginal portions of two sheets of glass along one edge thereof to form metallic ribbons thereon, arranging the glass sheets in spaced relation with the metallic ribbons thereon facing one another, inserting a spacer between the glass sheets to maintain said metallic ribbons in spaced relation, and then dipping the metallized edge portions of the glass sheets into a bath of molten solder whereupon said solder will pass upwardly between the metallic ribbons and secure them together.

10. The method of producing a film holder, comprising the steps of spraying molten metal upon the marginal portions of two sheets of glass along one edge thereof to form metallic ribbons thereon, arranging the glass sheets in spaced relation with the metallic ribbons thereon facing one another, inserting a spacer between the glass sheets to maintain said metallic ribbons in spaced relation, gripping the glass sheets at the edges thereof opposite to the edges containing the metallic ribbons, and then dipping the metallized edge portions of the glass sheets into a bath of molten solder whereupon said solder will pass upwardly between the metallic ribbons and secure them together.

MILTON KNIGHT.
JOHN J. HOPFIELD.